UNITED STATES PATENT OFFICE.

WILLIAM MUIR, OF EDMONTON, AND CHARLES ROBERT EDWARD BELL, OF BROMLEY, ENGLAND.

IGNITING MATERIAL FOR MATCHES.

SPECIFICATION forming part of Letters Patent No. 724,411, dated March 31, 1903.

Application filed December 22, 1902. Serial No. 136,216. (Specimens.)

*To all whom it may concern:*

Be it known that we, WILLIAM MUIR, residing at Edmonton, and CHARLES ROBERT EDWARD BELL, residing at Bromley, England, subjects of the King of England, have invented certain new and useful Improvements in or Relating to Mechanically-Igniting Material, of which the following is a specification.

The present invention relates to improvements in the composition employed in the manufacture of matches, fuses, and the like, the object being to produce any of these so that they can be ignited by friction or percussion without the use of yellow phosphorus.

It has been found that in addition to red phosphorus and yellow phosphorus there is another allotropic form of the element, the properties of which are intermediate between those of the red and yellow phosphorus. This body is bright-red to deep-orange colored. It is not poisonous, and its chemical activity is more than that of ordinary red phosphorus, but less than that of yellow phosphorus. The bright-red phosphorus is clearly distinguished from ordinary amorphous phosphorus by the following characteristics: It is obtained in a state of very fine division. When heated with dilute alkalies, it dissolves with generation of non-inflammable phosphoreted hydrogen. It dissolves in dilute nitric acid at ordinary temperatures. Organic colors, such as indigo, are bleached when boiled in aqueous solution with the bright-red phosphorus. When ammonia is added to it, a deep-black color is produced; but the bright-red phosphorus is re-formed when acid is added.

The bright-red phosphorus may contain small quantities of other substances, such as sulfur, in solid solution or otherwise.

According to this invention the bright-red allotropic form of phosphorus is used as a substitute for yellow phosphorus in igniting material for the composition of match-heads, fuses for cartridges, and the like in which the ignition is effected mechanically. As in the case of yellow phosphorus, the bright-red phosphorus is mixed with an oxygen-carrying composition, which consists of an oxygen-carrying salt, some hard pulverulent substance, and a binding agent.

For example, the following mixture may be used for igniting material: bright-red phosphorus, five parts, by weight; chlorate of potash, ($KClO_3$,) twenty parts, by weight; glass-powder, ten parts, by weight; kieselguhr, three and one-half parts, by weight; glue, ten parts, by weight.

Other substances may be used instead of the chlorate of potash, kieselguhr, glass, and glue.

What we claim as our invention, and desire to secure by Letters Patent, is—

1. In a mechanically-igniting material the combination with an oxygen-carrying composition of the bright-red allotropic form of non-poisonous phosphorus distinct in its characteristics from the commercial article known as red or amorphous phosphorus.

2. In a mechanically-igniting material the combination of the bright-red allotropic form of non-poisonous phosphorus, an oxygen-carrying salt and a hard powder.

3. In a mechanically-igniting material the combination of the bright-red allotropic form of non-poisonous phosphorus, chlorate of potash, hard mineral powder and a binding agent.

In testimony whereof we have signed our names to this specification in the presence of two subscribing witnesses.

WILLIAM MUIR.
CHARLES ROBERT EDWARD BELL.

Witnesses:
WILLIAM H. BALLANTYNE,
HARRY W. WRIDGLY.